(12) United States Patent
Baracco et al.

(10) Patent No.: US 10,240,943 B2
(45) Date of Patent: Mar. 26, 2019

(54) METHOD, APPARATUS AND COMPUTER PROGRAM PRODUCT FOR A NAVIGATION USER INTERFACE

(71) Applicant: HERE Global B.V., Eindhoven (NL)

(72) Inventors: Ruggero Baracco, Berlin (DE);
Stephan Scheunig, Wanditz (DE);
Mark Pearce, Berlin (DE)

(73) Assignee: HERE Global B.V., Eindhoven (NL)

( * ) Notice: Subject to any disclaimer, the term of this patent is extended or adjusted under 35 U.S.C. 154(b) by 81 days.

(21) Appl. No.: 15/185,649

(22) Filed: Jun. 17, 2016

(65) Prior Publication Data
US 2017/0363437 A1    Dec. 21, 2017

(51) Int. Cl.
*G01C 21/00* (2006.01)
*G01C 21/36* (2006.01)
*G01C 21/34* (2006.01)

(52) U.S. Cl.
CPC ....... *G01C 21/367* (2013.01); *G01C 21/3492* (2013.01)

(58) Field of Classification Search
CPC .. G01C 21/367; G01C 21/3492; G01C 21/00; G01C 21/36; G01C 21/26; G01C 21/3611; G08G 1/096894
USPC ................ 701/400, 423; 455/566; 345/619
See application file for complete search history.

(56) References Cited

U.S. PATENT DOCUMENTS

| | | | | |
|---|---|---|---|---|
| 6,023,652 A * | 2/2000 | Arakawa | ............ | G01C 21/3655 340/995.19 |
| 8,265,864 B1 * | 9/2012 | Kaufman | ............ | G01C 21/3679 340/995.14 |
| 8,365,074 B1 * | 1/2013 | Wagner | ............ | G06F 3/0488 345/661 |
| 8,825,264 B2 * | 9/2014 | Montemerlo | ........ | G05D 1/0055 701/23 |
| 9,008,961 B2 * | 4/2015 | Nemec | ............ | G05D 1/021 701/423 |
| 9,146,111 B2 * | 9/2015 | Barnes | ............ | G06Q 10/06 |
| 9,174,642 B2 * | 11/2015 | Wimmer | ............ | B60K 35/00 |
| 9,688,288 B1 * | 6/2017 | Lathrop | ............ | B60W 50/14 |
| 2011/0070924 A1 * | 3/2011 | Kim | ............ | G06Q 10/02 455/566 |

(Continued)

OTHER PUBLICATIONS

Extended European Search Report for Application No. EP 17 17 6252 dated Nov. 27, 2017, 11 pages.

*Primary Examiner* — Shardul D Patel
(74) *Attorney, Agent, or Firm* — Alston & Bird LLP

(57) ABSTRACT

A method, apparatus, and computer program product are therefore provided for providing a navigation user interface. The apparatus may be caused to: receive an indication of an origin and a destination; provide for presentation of a representation of the origin, a representation of the destination, and a representation of the route there between, where the representation of the route may include a bar extending in a circular shape between the representation of the origin and the representation of the destination, and defining a map display region within the circular shape. The apparatus may also be configured to provide for presentation of a present location indicator on the representation of the route and provide for presentation of a map within the map display region. The map within the map display region may correspond to at least one of a current location or a user selected location along the route.

18 Claims, 11 Drawing Sheets

(56) References Cited

U.S. PATENT DOCUMENTS

| | | | |
|---|---|---|---|
| 2012/0147030 A1* | 6/2012 | Hankers | G01W 1/00 345/619 |
| 2013/0147846 A1* | 6/2013 | Kalai | G06T 1/60 345/660 |
| 2014/0330517 A1* | 11/2014 | Barnes | G06Q 10/06 701/541 |
| 2014/0358438 A1* | 12/2014 | Cerny | G01C 21/00 701/537 |
| 2015/0241240 A1* | 8/2015 | Yamada | G01C 21/367 701/410 |
| 2016/0170487 A1* | 6/2016 | Saisho | G01C 21/3635 345/156 |
| 2017/0024121 A1* | 1/2017 | Park | G06F 3/04845 |
| 2017/0131113 A1* | 5/2017 | Nallu | G01C 21/3682 |
| 2017/0219364 A1* | 8/2017 | Lathrop | G01C 21/3453 |
| 2017/0284823 A1* | 10/2017 | McNew | G01C 21/3697 |

* cited by examiner

METHOD, APPARATUS AND COMPUTER PROGRAM PRODUCT FOR A NAVIGATION USER INTERFACE

TECHNOLOGICAL FIELD

An example embodiment of the present invention relates generally to providing navigation assistance, and more particularly, to a method, apparatus and computer program product for providing a navigation user interface.

BACKGROUND

Maps have been used for centuries for providing route geometry and geographical information, while routes have conventionally been planned by hand along paths defined by the maps. Conventional paper maps including static images of roadways and geographic features from a snapshot in history have given way to digital maps presented on computers and mobile devices, and navigation has been enhanced through the use of graphical user interfaces.

Digital maps and navigation can provide dynamic route guidance to users as they travel along a route. Further, dynamic map attributes such as route traffic, route conditions, and other dynamic map-related information may be provided to enhance the digital maps and facilitate navigation. Different map service providers along with different user interfaces (e.g., different mobile devices or different vehicle navigation systems) may result in non-uniform map and route guidance interfaces, which may not be intuitive or easily understood by a user, particularly one that is accustomed to a different type of map and navigation interface.

BRIEF SUMMARY

A method, apparatus, and computer program product are therefore provided for providing a navigation user interface. An apparatus may be provided including at least one processor and at least one non-transitory memory including computer program code instructions. The computer program code instructions may be configured to, when executed, cause the apparatus to at least: receive an indication of an origin and a destination; provide for presentation of a representation of the origin, a representation of the destination, and a representation of the route there between, where the representation of the route may include a bar extending in a circular shape between the representation of the origin and the representation of the destination, and defining a map display region within the circular shape. The apparatus may also be configured to provide for presentation of a present location indicator on the representation of the route and provide for presentation of a map within the map display region. The map within the map display region may correspond to at least one of a current location along the route or a user selected location along the route.

According to some embodiments, the apparatus may be caused to provide for presentation of a map within the map display region that corresponds to a location along the route corresponding to a user input at a first point corresponding to the location on the representation of the route, and dynamically panning the map within the map display region along the route in response to the user input moving along the representation of the route. The representation of the origin and the representation of the destination may be provided for presentation proximate one another, and the representation of the route may extend about at least 330 degrees of a circular shape from the origin to the destination.

The apparatus of example embodiments may be caused to provide for presentation of at least one event indicator on the representation of the route, and provide for presentation of information related to one of the at least one event indicators in response to the current location along the route corresponding to the position of the at least one event indicators on the representation of the route. Causing the apparatus to provide for presentation of information related to one of the at least one event indicators may include causing the apparatus to provide for presentation of the information within the map display region or on a heads-up display.

According to some embodiments, the apparatus may be within a vehicle, and the apparatus may be caused to: determine a speed of the vehicle; provide for presentation of a map within the map display region, where the map within the map display region corresponds to a portion of the route and does not include the current location of the vehicle in response to the speed of the vehicle falling below a predetermined value; and provide for presentation of a map within the map display region corresponding to a portion of the route including the current location of the vehicle in response to the speed of the vehicle rising above a predetermined value.

The representation of the route including a bar extending in a circular shape may be a first representation of the route, where the apparatus may be configured to provide for presentation of a second representation of the route in a concentric circular shape about the first representation, where the first representation of the route provides a first type of information about the route, and the second representation of the route provides a second type of information about the route. The first type of information may relate to traffic flow, where the second type of information may include information relating to navigation instructions. The apparatus may further be configured to provide for presentation of an indication on a portion of the representation of the route that the portion of the route corresponding to the portion of the representation of the route is compatible with autonomous vehicle operation.

Embodiments described herein provide a computer program product including at least one non-transitory computer-readable storage medium having computer-executable program code instructions stored therein. The computer-executable program code instructions may include program code instructions to: receive an indication of an origin and a destination; provide for presentation of a representation of the origin, a representation of the destination, and a representation of a route there between, where the representation of the route includes a bar extending in a circular shape between the representation of the origin and the representation of the destination, and where the circular shape defines a map display region therein. The computer program product may include program code instructions to provide for presentation of a present location indicator on the representation of the route, and provide for presentation of a map within the map display region, where the map within the map display region corresponds to at least one of a current location along the route or a user selected location along the route.

According to some embodiments, the computer program product may include program code instructions to: provide for presentation of a map within the map display region, where the map within the map display region corresponds to a location along the route corresponding to a user input at a first point corresponding to the location on the representation of the route; and dynamically panning the map within the map display region along the route in response to the user input moving along the representation of the route. The representation of the origin and the representation of the destination may be provided for presentation proximate one another, and the representation of the route may extend about at least 330 degrees of a circular shape.

Embodiments of the computer program product may include program code instructions to: provide for presentation of at least one event indicator on the representation of the route, and provide for presentation of information related to one of the at least one event indicators in response to the current location along the route corresponding to the position of the at least one event indicators on the representation of the route. The program code instructions to provide for presentation of information related to one of the at least one event indicators may include program code instructions to provide for presentation of the information within the map display region or on a head-up display.

According to some embodiments, the computer program product may include program code instructions to: determine a speed of a vehicle; provide for presentation of a map within the map display region, where the map within the map display region corresponds to a portion of the route and does not include the current location of the vehicle in response to the speed of the vehicle falling below a predetermined value; and provide for presentation of a map within the map display region, where the map within the map display region corresponds to a portion of the route including the current location of the vehicle in response to the speed of the vehicle rising above a predetermined value.

The representation of the route including a bar extending in a circular shape may be a first representation of the route, the computer program product including program code instructions to provide for presentation of a second representation of the route in a concentric circular shape about the first representation, where the first representation of the route provides a first type of information about the route, and the second representation of the route provides a second type of information about the route. The first type of information may include information relating to traffic flow, and the second type of information may including information relating to navigation instructions. The computer program product of some embodiments may include program code instructions to provide for presentation of an indication on a portion of the representation of the route that the portion of the route corresponding to the portion of the representation of the route is compatible with autonomous vehicle operation.

Embodiments of the present invention may provide a method including: receiving an indication of an origin and a destination; providing for presentation on a display of a representation of the origin, a representation of the destination, and a representation of a route there between, where the representation of the route includes a bar extending in a circular shape between the representation of the origin and the representation of the destination, and where the circular shape defines a map display region therein. Methods may include: providing for presentation on the display of a present location indicator on the representation of the route, and providing for presentation on the display of a map within the map display region, where the map within the map display region corresponds to at least one of a current location along the route or a user selected location along the route.

Methods of example embodiments may include: providing for presentation on the display of a map within the map display region, where the map within the map display region corresponds to a location along the route corresponding to the location on the representation of the route; and dynamically panning the map within the map display region along the route in response to the user input moving along the representation of the route.

BRIEF DESCRIPTION OF THE DRAWINGS

Figure 1:
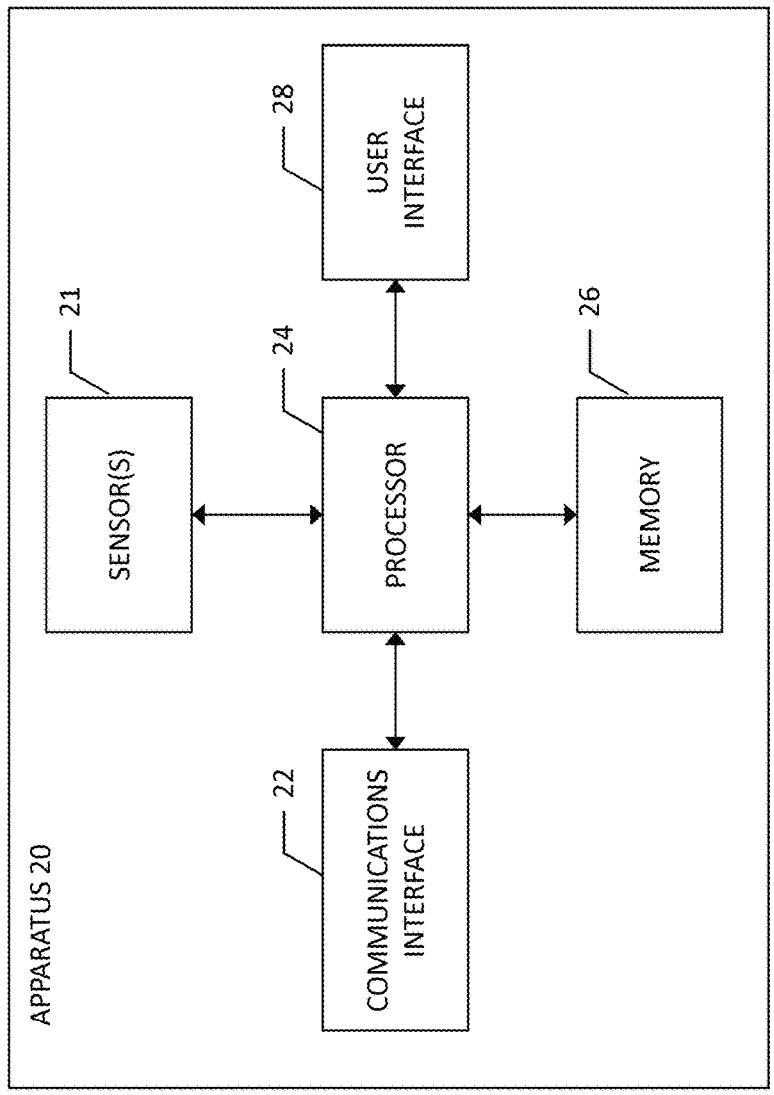
Figure 2:
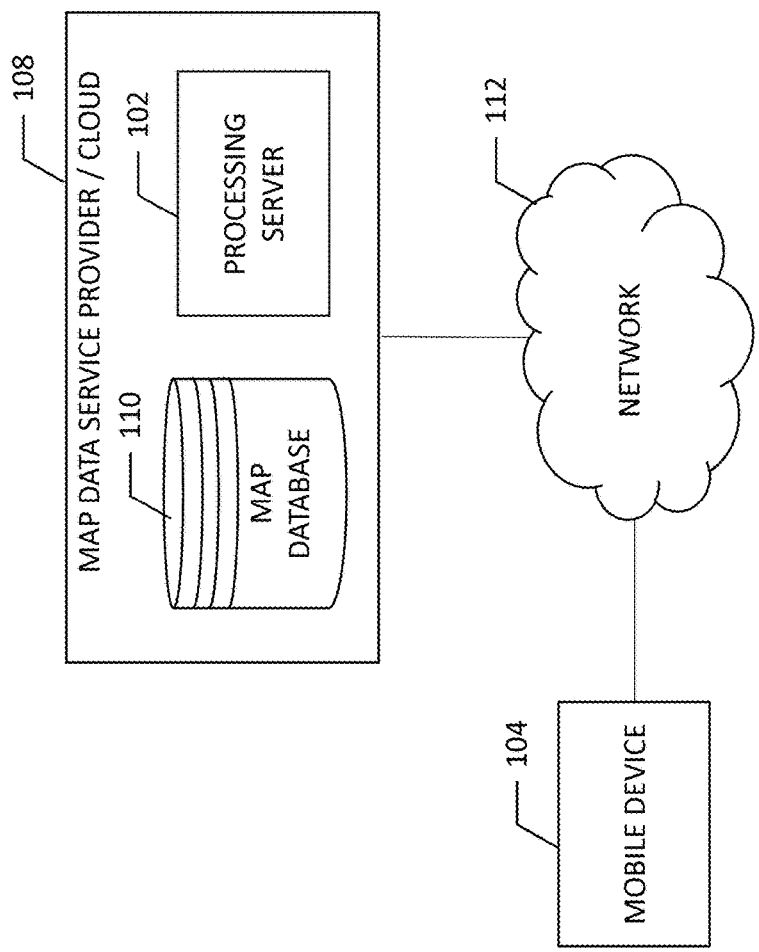
Figure 3:
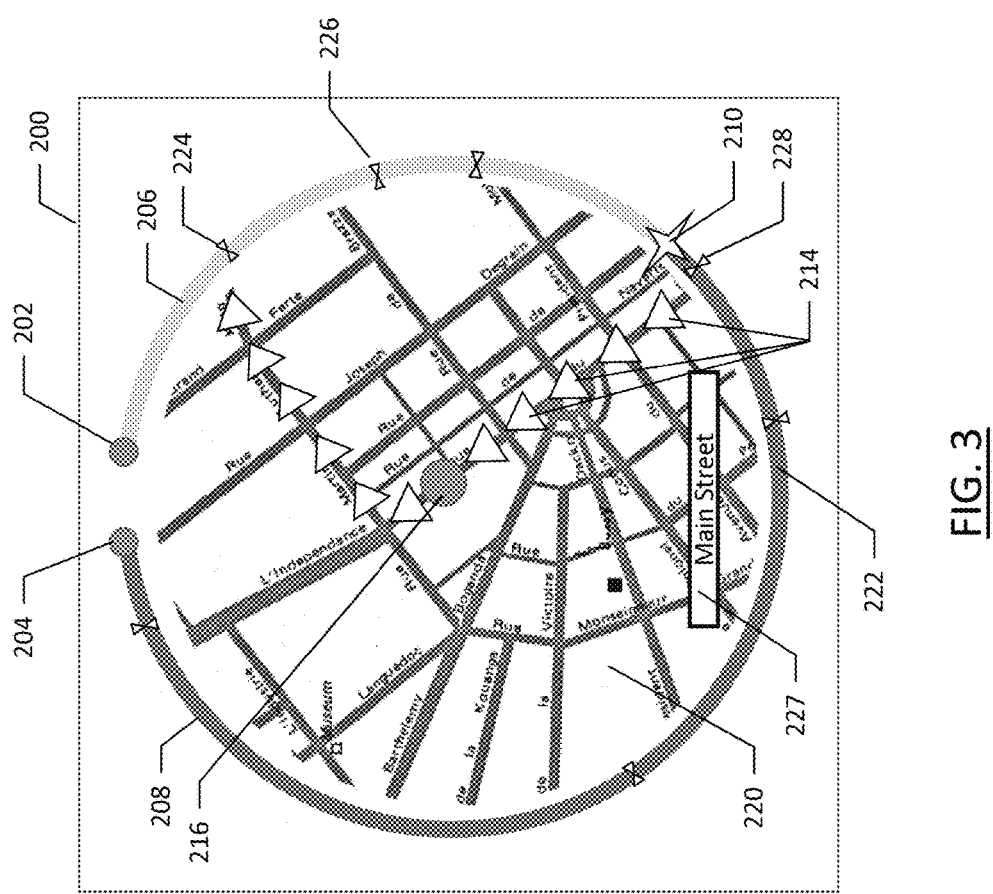
Figure 4:
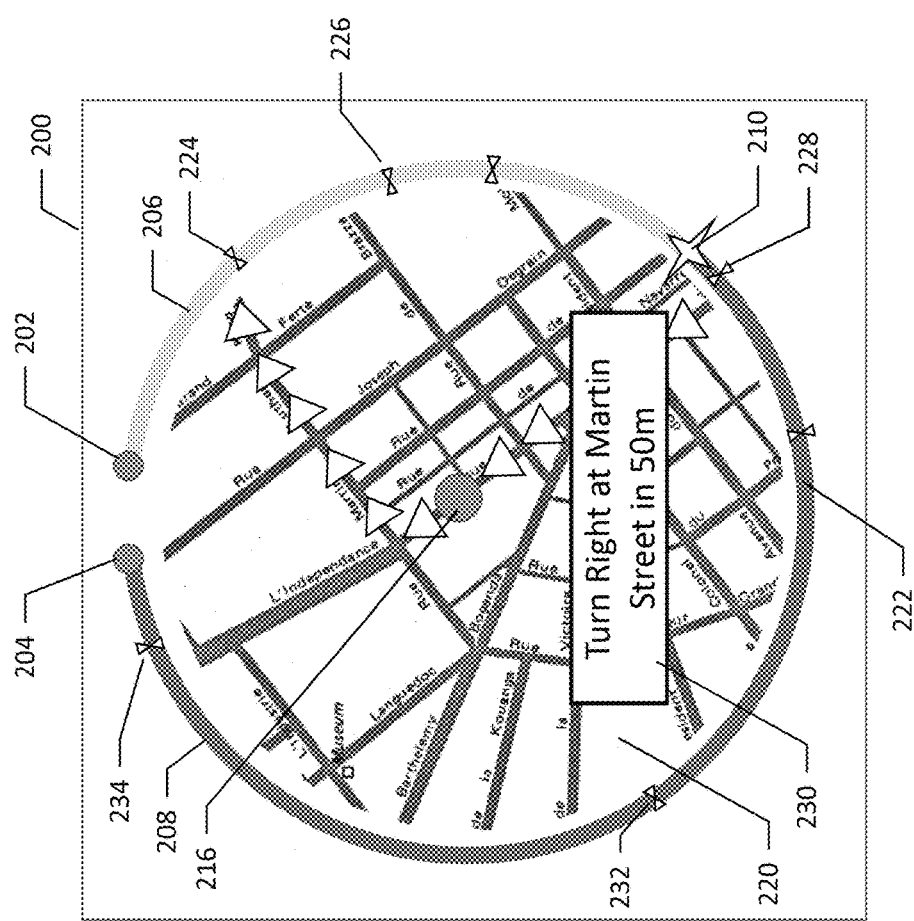
Figure 5:
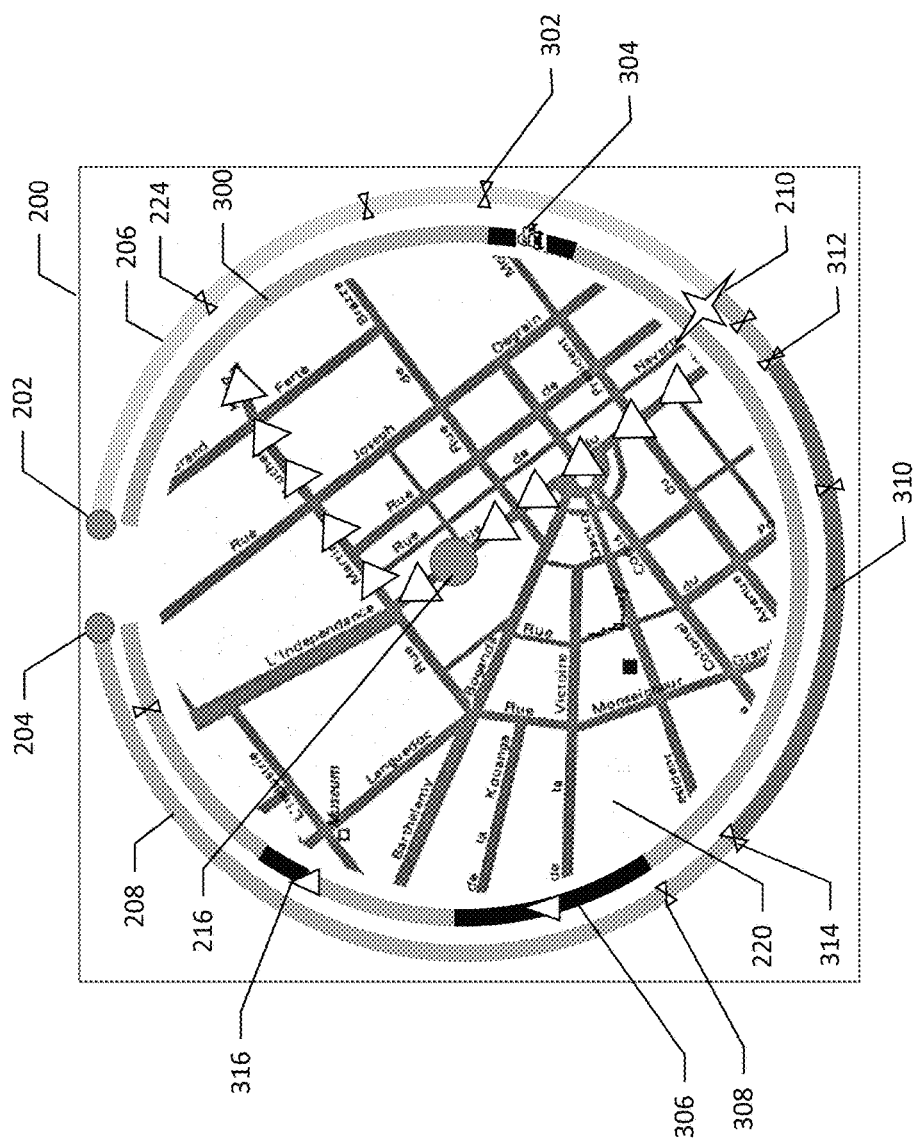
Figure 6:
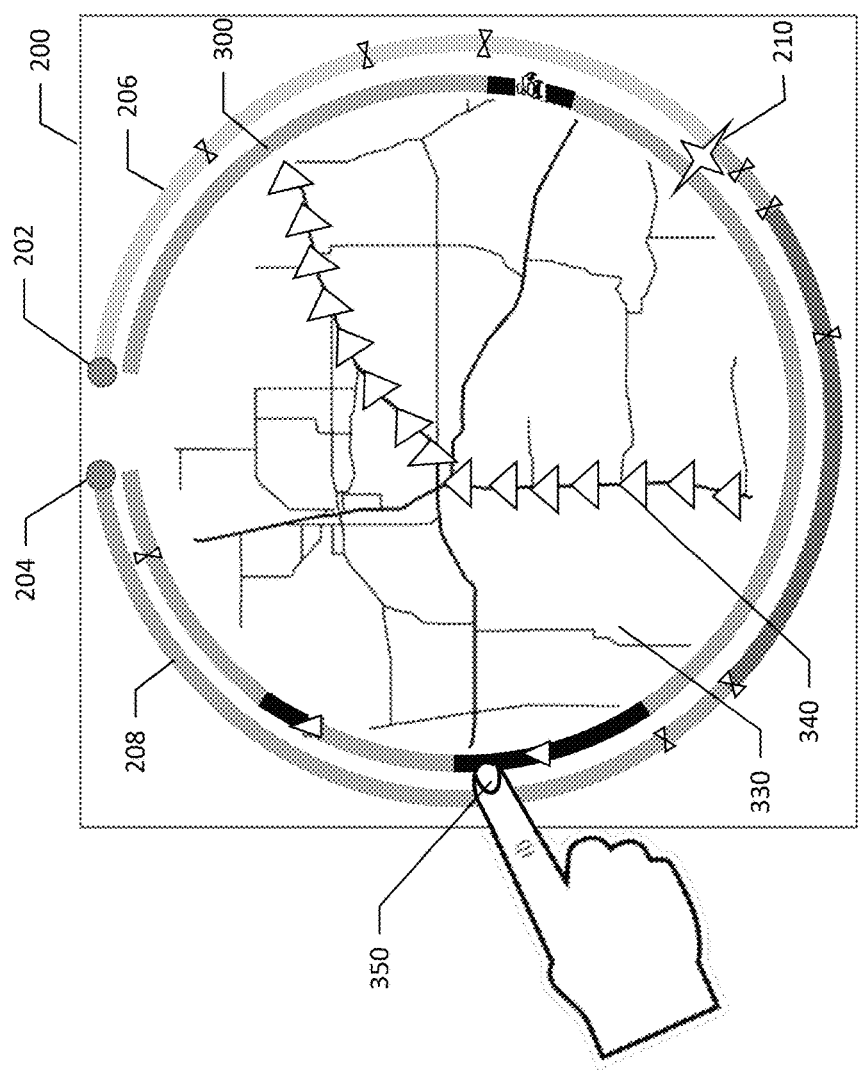
Figure 7:
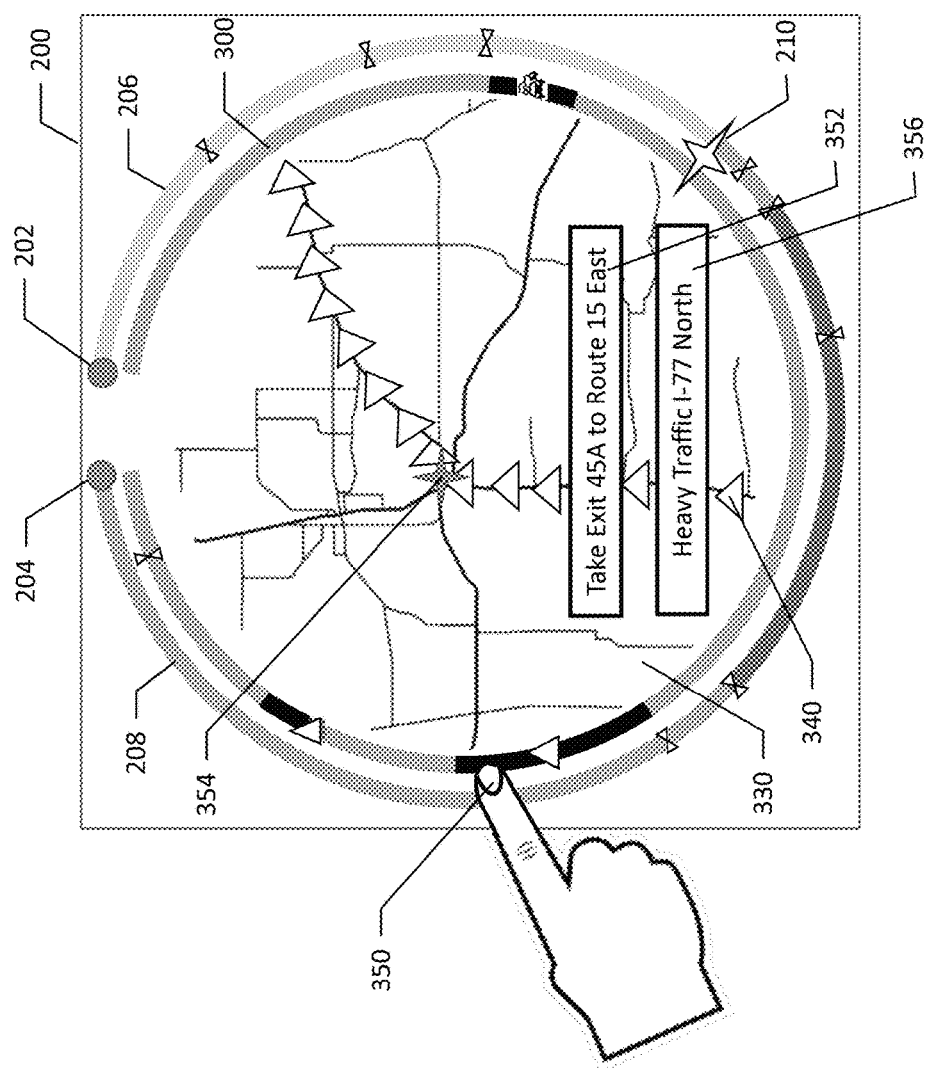
Figure 8:
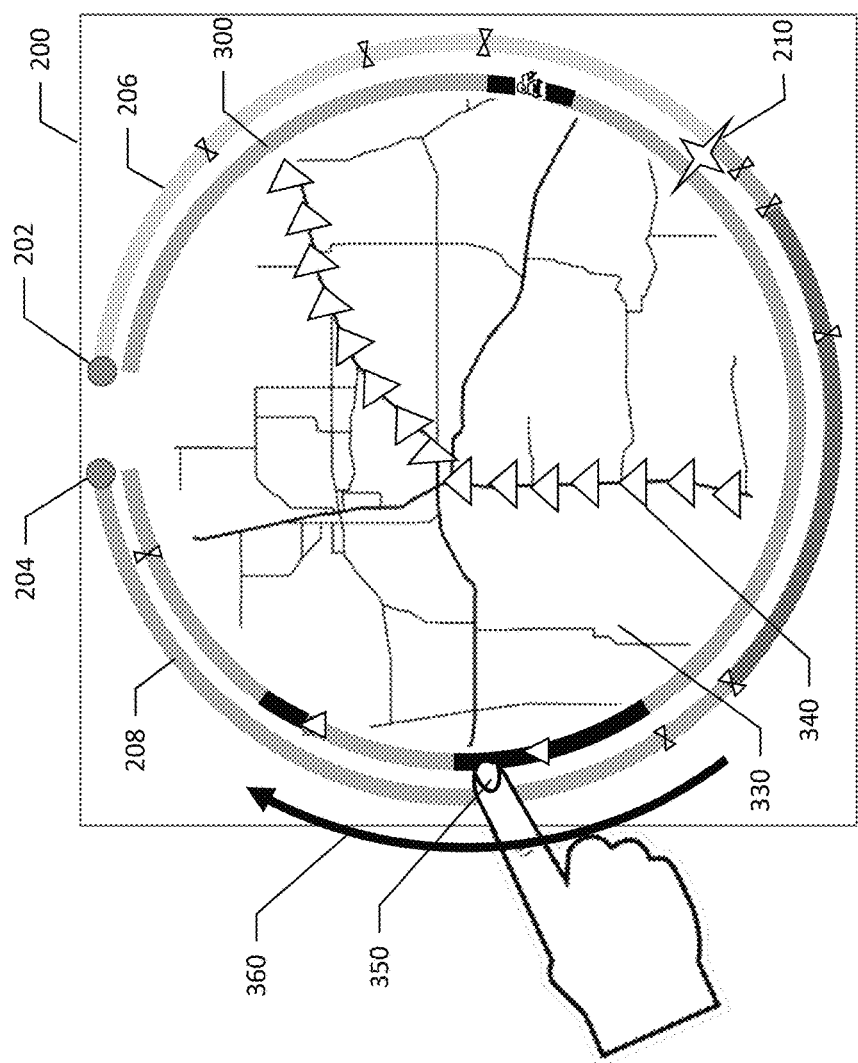
Figure 9:
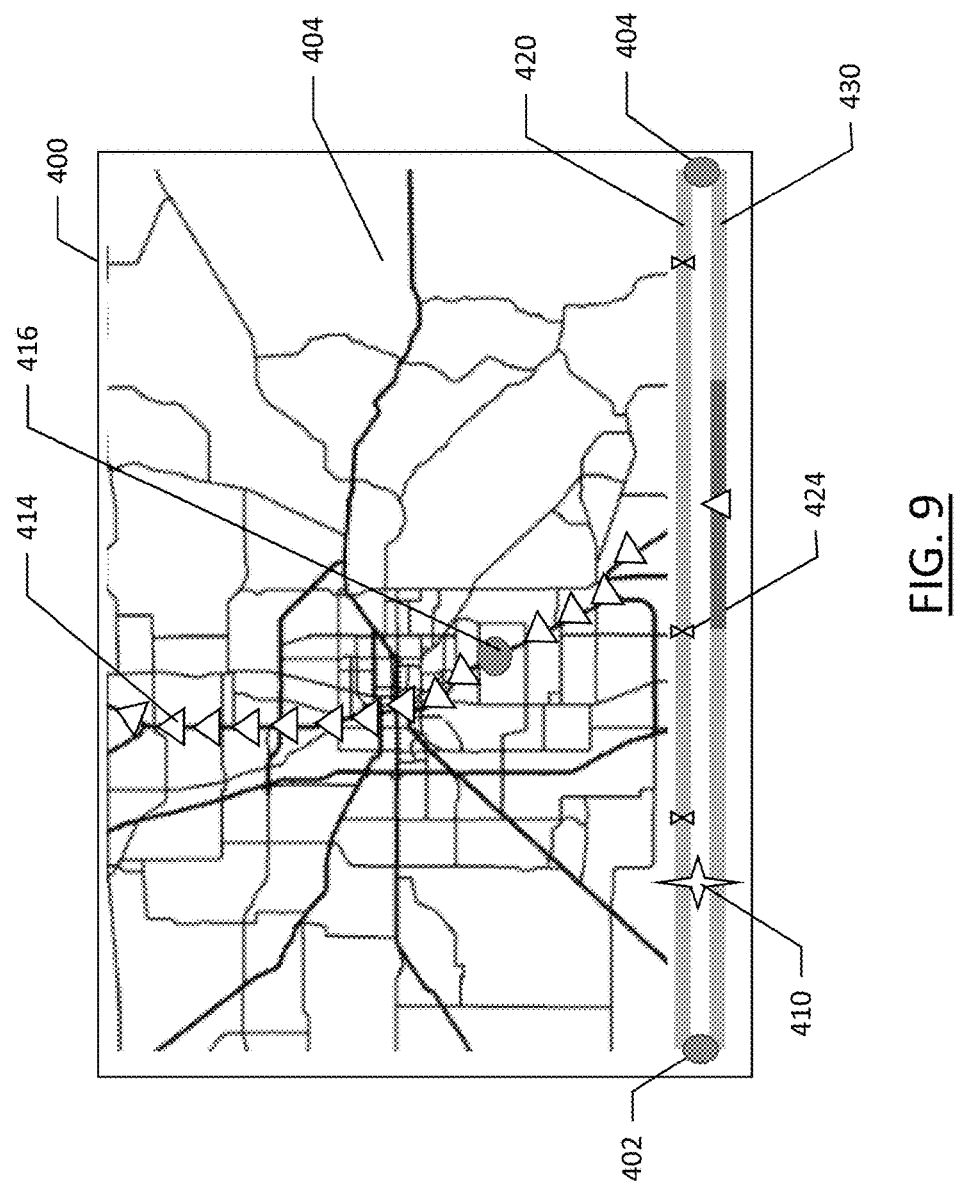
Figure 10:
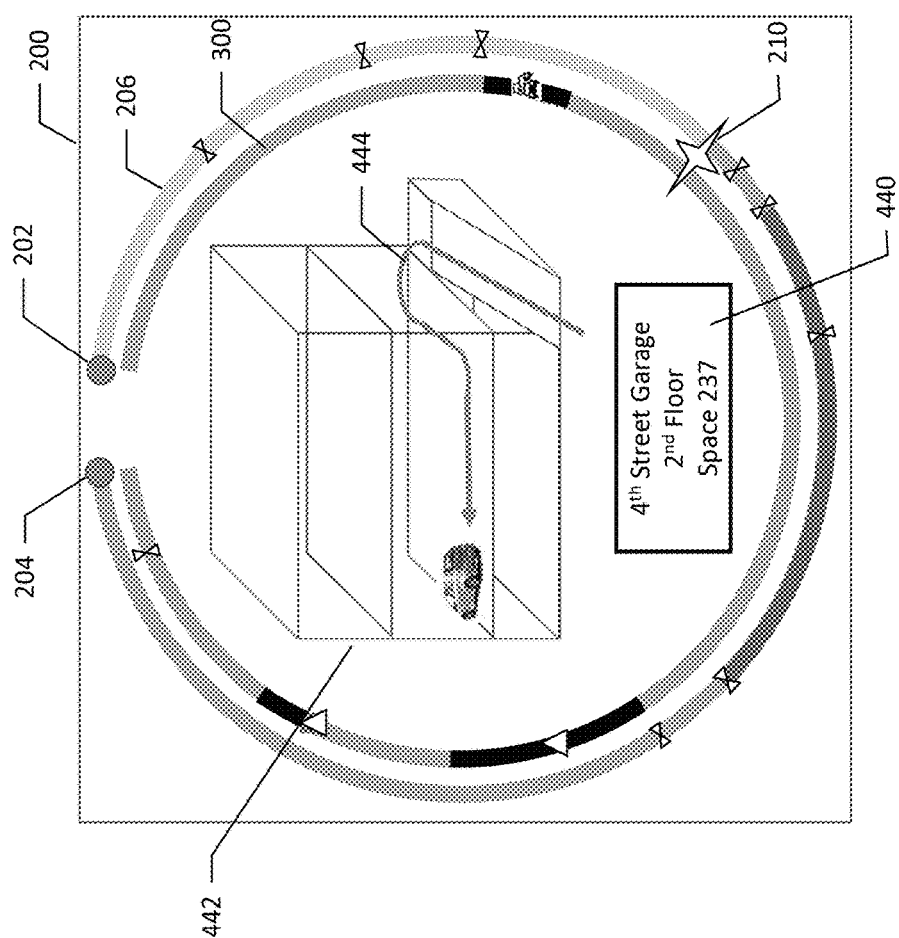
Figure 11:
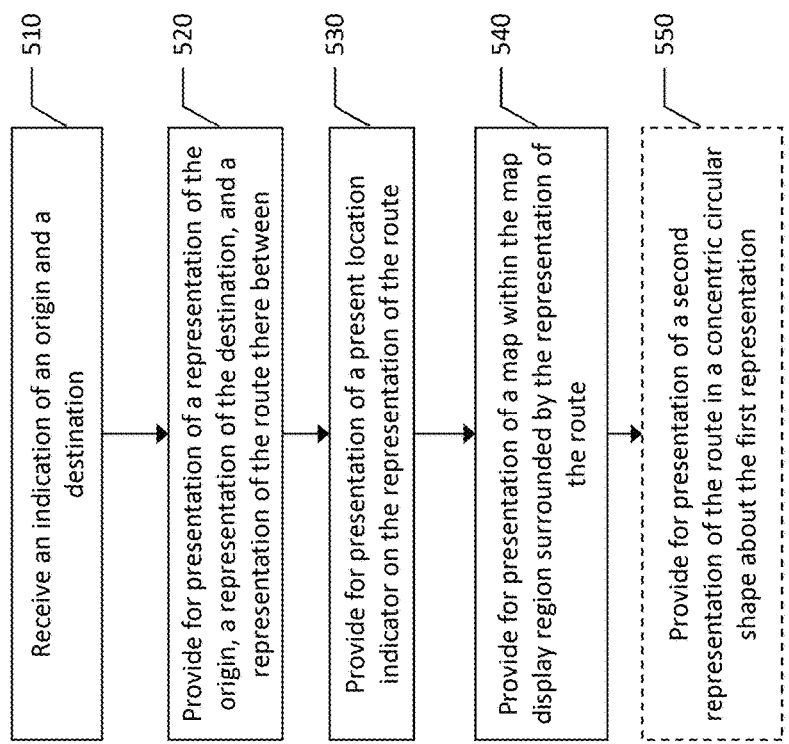

Having thus described certain example embodiments of the present invention in general terms, reference will hereinafter be made to the accompanying drawings which are not necessarily drawn to scale, and wherein:

FIG. 1 is a block diagram of an apparatus according to an example embodiment of the present invention;

FIG. 2 is a block diagram of a system of implementing route guidance on a navigation system according to an example embodiment of the present invention;

FIG. 3 is an example user interface for route guidance in a navigation system according to an example embodiment of the present invention;

FIG. 4 is another example user interface for route guidance in a navigation system according to an example embodiment of the present invention;

FIG. 5 is still another example user interface for route guidance in a navigation system according to an example embodiment of the present invention;

FIG. 6 is an example user interface for route guidance in a navigation system including a user input according to an example embodiment of the present invention;

FIG. 7 is another example user interface for route guidance in a navigation system including a user input according to an example embodiment of the present invention;

FIG. 8 is still another example user interface for route guidance in a navigation system including a user input according to an example embodiment of the present invention;

FIG. 9 is an example of a rectangular user interface for route guidance in a navigation system according to an example embodiment of the present invention;

FIG. 10 is an example of a final destination presentation within a user interface for route guidance in a navigation system according to an example embodiment of the present invention; and FIG. 11 is a flowchart of a method for operating a user interface for route guidance in a navigation system according to an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a physical storage medium (e.g., volatile or non-volatile memory device), may be differentiated from a "computer-readable transmission medium," which refers to an electromagnetic signal.

A method, apparatus and computer program product are provided in accordance with an example embodiment of the present invention for providing a navigation system user interface. In this regard, a user interface of a device, such a mobile device or a device affixed to a vehicle, such as to a dashboard or the like, may provide navigation assistance to a user. A display reflecting a planned route to a destination, a current location along the route, and/or other data relating to the navigation, such as estimated time until arrival, may be provided to the user so as to assist the user in turn-by-turn navigation. Such functionality may be referred to herein as a route guidance mode, as the device assists the user by providing navigation assistance from a perspective of a real-time detected location with respect to a planned route. As such, precise directions regarding upcoming turns and navigation can be provided with regard to the user's position along the route.

As described herein, embodiments of the claims provide for a user interface with a navigation system. The user interface described herein provides an intuitive and easily understood graphical representation of a route and information relating to the route, while also providing an easily understood interface for interacting with the navigation system to facilitate route guidance. A representation of an origin and a representation of a destination may be presented on a display proximate one another, with a representation of the route depicted as a circle or substantial portion of a circle that begins with the origin representation and ends with the destination representation. Within the circular representation of the route is defined a map display area in which a map may be presented corresponding to the current location along the route, or corresponding to a portion of the route selected by a user.

The circular representation of the route may include information about the route, such as dynamic traffic information (e.g., regarding accidents or construction, for example), and may include indicators of additional information or route guidance steps along the route. An icon or marker may appear on the circular representation of the route corresponding to a current location of the user (e.g., a device of the user which may be associated with the user's vehicle), and the distance around the circular representation of the route may be indicative of the amount of the route already traveled, and the amount of the route yet to travel.

FIG. 1 is a schematic diagram of an example apparatus configured for performing any of the operations described herein. Apparatus 20 is an example embodiment that may be embodied by or associated with any of a variety of computing devices that include or are otherwise associated with a device configured for providing a navigation system user interface. For example, the computing device may be a mobile terminal, such as a personal digital assistant (PDA), mobile telephone, smart phone, personal navigation device, smart watch, tablet computer, camera or any combination of the aforementioned and other types of voice and text communications systems. Optionally, the computing device may be a fixed computing device, such as a built-in vehicular navigation device, assisted driving device, or the like.

Optionally, the apparatus may be embodied by or associated with a plurality of computing devices that are in communication with or otherwise networked with one another such that the various functions performed by the apparatus may be divided between the plurality of computing devices that operate in collaboration with one another.

The apparatus 20 may be equipped with any number of sensors 21, such as a global positioning system (GPS), accelerometer, and/or gyroscope. Any of the sensors may be used to sense information regarding the movement, positioning, or orientation of the device for use in navigation assistance, as described herein according to example embodiments. In some example embodiments, such sensors may be implemented in a vehicle or other remote apparatus, and the information detected may be transmitted to the apparatus 20, such as by near field communication (NFC) including, but not limited to, Bluetooth™ communication, or the like.

The apparatus 20 may include, be associated with, or may otherwise be in communication with a communication interface 22, processor 24, a memory device 26 and a user interface 28. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 20 may be embodied by a mobile device. However, in some embodiments, the apparatus may be embodied as a chip or chip set. In other words, the apparatus may comprise one or more physical packages (for example, chips) including materials, components and/or wires on a structural assembly (for example, a circuit board). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 24 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 24 may be configured to execute instructions stored in the memory device 26 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of an example embodiment may also include or otherwise be in communication with a user interface 28. The user interface may include a touch screen display, a speaker, physical buttons, and/or other input/output mechanisms. In an example embodiment, the processor 24 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 24, and/or the like). In this regard, the apparatus 20 may interpret positioning data collected by its sensors and provide a destination preview including visual and audio feedback, to a user, for example.

The apparatus 20 of an example embodiment may also optionally include a communication interface 22 that may be any means such as a device or circuitry embodied in either hardware or a combination of hardware and software that is configured to receive and/or transmit data from/to other electronic devices in communication with the apparatus, such as by NFC, described above. Additionally or alternatively, the communication interface 22 may be configured to communicate over Global System for Mobile Communications (GSM), such as but not limited to Long Term Evolution (LTE). In this regard, the communication interface 22 may include, for example, an antenna (or multiple antennas) and supporting hardware and/or software for enabling communications with a wireless communication network. Additionally or alternatively, the communication interface 22 may include the circuitry for interacting with the antenna(s) to cause transmission of signals via the antenna(s) or to handle receipt of signals received via the antenna(s). In some environments, the communication interface 22 may alternatively or also support wired communication may alternatively support vehicle to vehicle or vehicle to infrastructure wireless links.

The apparatus 20 may support a mapping application so as to present maps or otherwise provide navigation assistance. In order to support a mapping application, the computing device may include or otherwise be in communication with a geographic database, such as may be stored in memory 26. For example, the geographic database includes node data records, road segment or link data records, point of interest (POI) data records, and other data records. More, fewer or different data records can be provided. In one embodiment, the other data records include cartographic data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. Furthermore, other positioning technology may be used, such as electronic horizon sensors, radar, lidar, ultrasonic and/or infrared sensors.

In example embodiments, a navigation system user interface may be provided to provide route guidance from an origin to a destination. Navigation systems may receive an indication of an origin, which may include a current location of a device on which the navigation system is operating (e.g., an in-vehicle navigation system or a mobile device, for example), and an indication of a destination where the user of the navigation system is going. In response to receiving the origin and destination pair, a route may be generated between the origin and destination. The route may be generated according to user preferences for fastest travel time, minimizing highways (e.g., limited access high-speed roadways), maximizing highways, shortest distance, etc. Further, waypoints may be provided between the origin and destination, or a route may include multiple, sequential destinations. Example embodiments provided herein may be used for a navigation system user interface to provide route guidance to the first destination, the last destination, or the ultimate destination with waypoints indicated in the route guidance from the origin. However, for ease of understanding, embodiments described herein will generally include route guidance between a single origin and single destination.

A map service provider database may be used to provide route guidance to a navigation system. FIG. 2 illustrates a communication diagram of an example embodiment of a system for implementing example embodiments described herein. The illustrated embodiment of FIG. 2 includes a mobile device 104, which may be, for example, the apparatus 20 of FIG. 2, such as a mobile phone, an in-vehicle navigation system, or the like, and a map data service provider or cloud service 108. Each of the mobile device 104 and map data service provider 108 may be in communication with at least one of the other elements illustrated in FIG. 2 via a network 112, which may be any form of wireless or partially wireless network as will be described further below. Additional, different, or fewer components may be provided. For example, many mobile devices 104 may connect with the network 112. The map data service provider 108 may be cloud-based services and/or may operate via a hosting server that receives, processes, and provides data to other elements of the system.

The map data service provider may include a map database 110 that may include node data, road segment data or link data, point of interest (POI) data, traffic data or the like. The map database 110 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 110 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 110 can include data about the POIs and their respective locations in the POI records. The map database 110 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 110 can include event data (e.g., traffic incidents, construction activities, scheduled events, unscheduled events, etc.) associated with the POI data records or other records of the map database 110.

The map database 110 may be maintained by a content provider e.g., the map data service provider and may be accessed, for example, by the content or service provider processing server 102. By way of example, the map data service provider can collect geographic data and dynamic data to generate and enhance the map database 110 and dynamic data such as traffic-related data contained therein. There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them, for example. Also, remote sensing, such as aerial or satellite photography and/or LIDAR, can be used to generate map geometries directly or through machine learning as described herein. However, the most ubiquitous form of data that may be available is vehicle data provided by vehicles, such as mobile device 104, as they travel the roads throughout a region.

The map database 110 may be a master map database stored in a format that facilitates updates, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle represented by mobile device 104, for example. The navigation-related functions can correspond to vehicle navigation, pedestrian navigation, or other types of navigation. While example embodiments described herein generally relate to vehicular travel along roads, example embodiments may be implemented for pedestrian travel along walkways, bicycle travel along bike paths, boat travel along maritime navigational routes, etc. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the map data service provider 108 map database 110 may be a master geographic database, but in alternate embodiments, a client side map database may represent a compiled navigation database that may be used in or with end user devices (e.g., mobile device 104) to provide navigation and/or map-related functions. For example, the map database 110 may be used with the mobile device 104 to provide an end user with navigation features. In such a case, the map database 110 can be downloaded or stored on the end user device which can access the map database 110 through a wireless or wired connection, such as via a processing server 102 and/or the network 112, for example.

In one embodiment, as noted above, the end user device or mobile device 104 can be embodied by the apparatus 20 of FIG. 1 and can include an in-vehicle navigation system, such as an ADAS (advanced driver assistance system), a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the mobile device 104 for navigation and map functions such as guidance and map display, for example, and for determination of one or more personalized routes or route segments based on one or more calculated and recorded routes, according to some example embodiments.

Route guidance from an origin to a destination may be communicated to a user via a display, such as a display of user interface 28 of apparatus 20 of FIG. 1. The display may be a display of a mobile phone, or a screen of an in-vehicle navigation system, for example. In the presentation of the route guidance information to the user it is important that the information is communicated clearly and in an easily understood manner such that a user may quickly understand the information presented. As a user of a navigation system may be driving a vehicle, it is important that the navigation information including route guidance information is quickly and easily understood, without requiring substantial user interaction should additional information be needed by the driver.

Example embodiments provided herein provide an intuitive and easily understood user interface for route guidance of a navigation system. FIG. 3 illustrates an example embodiment of a user interface for a navigation system to provide route guidance information to a user. According to the illustrated embodiment of FIG. 3, a user interface may be provided for display on display 200. While the illustrated embodiment depicts a square or 1:1 aspect ratio display, the user interface described herein may be provided for display on any size or aspect ratio display, such as a 4:3, 16:9, for example, or presented on a display of an irregular or uncommon shape, including, but not limited to a circular display, a trapezoidal display, etc.

A route may be generated based on a request by a user for a route between an origin and a destination. The route may be generated, for example, by a map data service provider 108 using a map database 110 and processing server 102. Optionally, the route may be generated locally on the apparatus 20, such as using processor 24 and locally stored map data in memory 26. While example embodiments described herein may be directed primarily toward driving routes, involving roadways, other types of routes may benefit from embodiments of the present invention. For example, walking routes, bicycling routes, public transit routes, etc., may each benefit from some or all of the features of the present invention described herein.

FIG. 3 depicts a representation of a route origin 202 and a representation of a route destination 204 presented using processor 24 proximate the top of the display 200 (e.g., of user interface 28) and proximate one another. A representation of the route 206/208 is depicted by a bar extending from the representation of the origin 202 to the representation of the destination 204 in a circular shape. The circular shape of the representation of the route may extend, for example, about 90% of a circle, or about 330 degrees or more. The representation of the route 206/208 includes the entire route depicted in either total distance or total time. For example, according to the illustrated example, the location identified at 222 along the representation of the route 208 would be approximately halfway in distance (e.g., 30 miles of a 60 mile total route) between the origin and the destination if the representation of the route was distance-based. Alternatively, if the representation of the route was time-based, the location identified at 222 along the representation of the route 208 would be approximately halfway to the destination in terms of time (e.g., after one hour of a two-hour trip). While the temporally-based route representation and the distance-based route representation may appear identical in some circumstances (e.g., when a route is able to be driven at a relatively constant speed), often the temporally-based representation of the route will differ from the distance-based representation of the route. A user may switch between a temporally-based representation and a distance-based representation using user interface 28 of apparatus 20, or set the viewed representation according to a user preference.

According to the illustrated embodiment, a position marker 210 may illustrate the user's present location along the representation of the route 206/208. Further, as shown in FIG. 3, the already-traveled portion of the representation of the route 206 may appear a different color, shade, transparency/opacity, or pattern than a yet-to-be traveled portion of the representation of the route 208. The data supporting the user interface may be provided via the map data service provider 108, or alternatively, provided by the device itself via processor 24 using information from sensor(s) 21, such as a GPS sensor. The position marker 210 may advance around the representation of the route in a clockwise direction as the user travels along the route as determined by the sensor(s) 21. The direction of progression of the circular representation of the route is described herein generally as clockwise; however, a counter-clockwise progression may be available, such as via a user-selectable preference, or based on a user's location.

Defined within the circular shaped representation of the route 206/208 is a map display region 220 in which a map is presented. The map may depict various locations in dependence of the interaction with the navigation system by a user. However, during route guidance, typically the map 220 may illustrate the current location corresponding to the position marker 210 along the representation of the route 206/208. An icon 216 may depict the user's current location on the map, while a route 214 may be depicted by any form of highlighting. The illustrated highlighting of the route with directional arrowheads is merely an example that is visible in the standard black-and-white illustrations of a patent; however, it is appreciated that any highlighting technique of color, shape, dynamic line, etc., can be used to represent the route of the route guidance system in the map 220. An indication of the current street or road along which the user/vehicle is traveling may optionally be provided in information block 227.

According to the illustrated embodiment of FIG. 3, the portion of the map displayed may be presented entirely within the circular representation of the route 206/208. The map may abut the circular representation of the route in order to maximize use of the map display region 220. Alternatively, the map may be inset within the circular representation of the route to provide a buffer in which route markers, such as decisive markers 224, 226, and 228, for example, may be clearly discerned from the map 230. This inset may be minimal, such as less than a centimeter, for example, in order to maximize the size of the map presented within the map display area 220 while also providing a visual buffer between the map display area and the representation of the route 206/208.

According to some embodiments, as the user progresses along the route, the position marker 210 may advance along the representation of the route 206/208. Further, the map 220 depicted within the map display area may pan such that the current location icon 216 remains proximate the middle of the map display area. The panning of the map or advancing of the map along the route may be performed, for example, by processor 24 using sensor(s) 21 to determine the appropriate current location. This enables the user to see at least a portion of the upcoming route and to be able to anticipate turns or other items depicted on the map.

The representation of the route 206/208 may optionally include decisive markers 224, 226, 228, etc. These decisive markers may be indicative of a route guidance instruction for the user to make a turn, to enter a highway, or to make some alteration to their direction required by the route guidance. The information associated with these decisive markers may be stored, for example in memory 26 when the route is generated, such as by processor 24 or by map data service provider 108. For example, as position marker 210 advances clockwise around the representation of the route 206/208, and as the current location icon 216 approaches a turn on the route (shown as a right turn at an intersection), decisive marker 228 may indicate that the user is to turn right at the intersection. As the position marker 210 approaches the decisive marker, an indication may be provided to the user. FIG. 4 illustrates such an indication 230 which provides instructions to the user to turn right at the upcoming intersection onto a named street. The indication may also provide an indication of the distance to the turn from the current position as shown in 230. The indication 230 may be presented a predetermined time or predetermined distance before the user is to arrive at the intersection (or before the position marker 210 reaches decisive marker 228). The distance before the decisive marker at which the indication may appear may be determined based on a determined speed of the user/vehicle, such that if the user is going very slowly, the indication may not be needed until they are within 200 meters. However, if the user is traveling very quickly, the indication may be needed 1,000 meters before the decisive marker, for example. This degree of notification before the decisive marker may optionally be time-based, such that the indication appears a predefined time before the user is anticipated to be at the decisive marker, such as one minute.

Markers disposed on the representation of the route 206/208 may also be an indication of other information or warnings to a user about the route. For example, markers such as 232 and 234 in FIG. 4 may indicate a traffic event, such as an accident or disabled vehicle, or the markers may indicate the beginning of a traffic jam or construction area. The markers disposed on the representation of the route 206/208 may indicate a position along the route for which additional information is available, and the position may be indicative of an event or instruction that affects travel along the route. As such, the markers disposed on the representation of the route 206/208 may be added or removed dynamically during transit of the route as traffic patterns change or as available information changes. The changes to the information may be provided, for example, by map data service provider 108 as it monitors traffic flow along the route, and communicated to the apparatus, such as using communications interface 22.

Different types of markers may be indicated through differing colors or differing shapes of the markers. For example, a decisive marker indicative of a navigational instruction may be of a first color or shape, while a marker indicative of the beginning of a construction zone may be of a different color or shape.

In an example embodiment in which waypoints are added to a route, or points-of-interest are included in a route, markers 232, 234, may be informative markers that indicate the position of a waypoint or point-of-interest along the route.

While a representation of the route may provide various types of information to a user during route guidance of a navigation system, a second representation of the route may optionally be provided to enable additional information to be presented. FIG. 5 illustrates an example embodiment in which the representation of the route 206/208 is a first representation of the route, while a second representation 300 of the route is a concentric circular shaped representation similar to that of the first representation 206/208. The second representation of the route 300 may be arranged in a similar manner to the first representation 206/208, having a circular shape between the representation of the origin 202 and the representation of the destination 204. The two circular representations of the route 300 and 206/208 may be immediately adjacent to one another without a buffer gap there between. Optionally, a visual buffer between the two representations of the route may be provided in order to allow markers displayed on the representations of the routes to be more clearly discernable while not interfering with the other representation of the route. Such a visual buffer may be relatively small, such as the same width as width of the bar representing the route or less. The position indicated on the first representation 210 may correspond to the position on the second representation 300 and progress around the circular shaped route representation in the same manner simultaneously as updated by processor 24 using the location sensor(s) 21. As shown in FIG. 5, the representation of the position of the user/vehicle 210 extends across both representations of the route.

While the first representation of the route 206/208 may depict all of the information described above, the second representation of the route 300 may provide additional information or provide a different level of detail on information that may also be provided to some degree on the first representation of the route. For example, the first representation of the route may include an indicator 302 that indicates the beginning of a portion of the route with slow traffic. The second representation of the route 300 may include a highlighted portion of the route 304 that indicates either the distance portion of the route for which traffic is slowed in a distance-based representation of the route, or a time duration in which the user will experience slowed traffic in a temporally-based representation of the route. Additionally, a color of the highlighted portion of the route 304 may indicate a degree of slowed traffic, with a more intense color or darker color indicating a higher degree of slow or stopped traffic, with a lighter color or softer hue indicating a mild slowing of traffic, such as 10 to 20 miles per hour below the posted speed limits.

Similarly, the second representation of the route 300 may provide an indication of an accident along the route at 306, and provide an indication via highlight of the stretch of the route that is adversely affected by the accident. The color, opacity, intensity, etc., may be used to convey the severity or degree to which traffic is affected, as noted above. An information marker 308 may provide a user with an indication of the accident and associated traffic back-up in advance of reaching the affected area.

While the two examples provided above describe examples of adverse traffic events, such as accidents and traffic jams, other information may be conveyed via the second representation of the route 300. Element 316 depicts a portion of the route under construction, as indicated by the construction icon. There may be no adverse traffic affects at the point in time represented in FIG. 5, such that no informational marker is provided in the first representation of the route 208. However, the indication of a portion of the route under construction 316 may indicate to a user that there is a potential for adverse traffic effects to occur and to be wary of the route during that portion.

Further, information may be provided on one or both of the first or second representations of the route with regard to autonomous vehicle functionality. Autonomous vehicles are increasingly present on roadways, and certain roadways and traffic situations are well suited to autonomous vehicle travel. During the infancy of autonomous vehicle development, as autonomous vehicles become commercially available to consumers, certain roadways may be designated as autonomous-vehicle compatible, where autonomous vehicle functionality is permitted. Further, autonomous vehicle functionality may be regulated by different localities such that certain localities may not permit autonomous vehicle operation while other localities may permit such operation. As such, routes may include portions that are compatible with autonomous vehicle functionality and portions that are not compatible with autonomous vehicle functionality.

Autonomous vehicle functionality may have varying degrees of autonomy. For example, adaptive cruise control is one form of autonomy, where a vehicle may be set to a desired speed and a desired minimum following distance. This type of functionality may be widely available along a route. Full autonomous vehicle functionality may include essentially driverless functionality, where the autonomous functions control the speed, steering, and make other decisions related to driving. A route that includes portions designated as available for full autonomous vehicle functionality may alert a user as to the availability of such autonomous vehicle functionality upon entering the portion of the route, such that a driver may engage autonomous vehicle functionality and cease to control the vehicle speed and steering themselves. Upon reaching the end of such a portion of a route, a user may be alerted that the autonomous vehicle functionality will no longer be available a predetermined distance or time before that point is reached. At such time, a user may regain control of the vehicle speed and steering from the autonomous functionality. In an example embodiment in which a vehicle is reaching the end of a portion of a route in which autonomous vehicle functionality is permitted, and the vehicle is functioning autonomously, the vehicle may move out of traffic and come to a controlled and safe stop in response to a user failing to retake control of the vehicle functions.

As shown in FIG. 5, a portion of the route 310, as shown within the second representation of the route 300, may be compatible with full autonomous vehicle functionality. An information indication 312 may provide an indication of the start of the route portion that is compatible with autonomous vehicle functionality, while information indication 314 indicates the end of the route portion compatible with autonomous vehicle functionality. This route portion may be highlighted to be distinct from other portions of the representation of the route with a different color, intensity, opacity, dynamic feature (e.g. slow pulse, etc.) or the like.

As described above, example embodiments of a user interface for route guidance in a navigation system may provide a map displayed in a map display region corresponding to a present location of the user/vehicle as they travel along the route. However, a user may wish to view other portions of the route before they physically arrive at those locations. FIG. 6 illustrates an example embodiment in which a user may touch a different portion of the representations of the route 208 and/or 300, and the map display region 330 may display a map of a region corresponding to that portion of the route. As shown, the user's present location may not be on the portion of the map shown; however, the route 340 through that portion of the map may be illustrated. A user may touch one or both of the representations of the route, such as at a location of an information identifier. If a user touches within a predefined distance of the information identifier, the user may be shown the portion of the map corresponding to that portion of the route, but also shown information corresponding to the information identifier touched.

FIG. 7 illustrates an example embodiment in which the touch 350 is received proximate an information indication on one or both of the representations of the route 208 and 300. In the illustrated embodiment, the touch 350 is proximate a route guidance instruction of "Take Exit 45A to Route 15 East" such that an information block 352 is shown describing this information indication and a location of that route guidance instruction 354 is shown on the portion of the route corresponding to the touch input 350. Further, as there is a traffic alert on the second representation of the route 300 corresponding to a traffic incident at the location corresponding to the touch input 350, a second information element may be provided describing the traffic incident and ramifications 356. The map display region may revert to a depiction of the region in which the user/vehicle is presently located in response to the touch input 350 being removed. This reverting to the present location may be performed substantially instantly as the touch input is removed, or after a predefined time after the touch input is removed (e.g., three seconds).

According to some embodiments, the touch user input may also be dynamically applied. For example, as illustrated in FIG. 8, in response to a touch input 350 moving along the first and/or second representation of the route 208 and 300, the map presented within the map display region may dynamically pan along the route, maintaining the location along the route corresponding to the position of the touch input on the representation of the route proximate the center of the map display region. This may enable a user to virtually advance the map along the route that will be traveled if the user continues along the route planned by the route guidance system. As noted above, the map view in the map display area 330 may revert to the user's current location in response to the user touch input being removed, either immediately or after a predetermined period of time.

The orientation of the map within the map display region 330 may be oriented according to user preferences. For example, the map may be presented in a "North=Up" orientation in which the compass heading North is always maintained at the top of the display. Optionally, a user may select a "Travel Direction=Up" orientation in which, regardless of the compass heading in which the user is traveling, the map is always presented with the user traveling up, toward the top of the display. In this manner, the orientation of the map may change as the driver turns to different compass headings, or as a user previews future portions of the route as described above with respect to FIGS. 7 and 8. A compass heading direction may be provided on the display to orient the map with respect to the compass.

While the maps presented in the map display region of the example embodiments herein are conventional overhead-view maps, embodiments may include perspective view maps that show a view that is more closely related to the driver's perspective of the road. This type of map view may be more easily understood to some users.

According to some embodiments described herein, information regarding the route guidance system may be presented to a user through a heads-up display (HUD). The HUD may be configured to present an image and/or text on the windshield of a vehicle that does not obscure the user's view of the road, but presents information in a location easily read by a user while minimally distracting from the user driving. Information such as an upcoming turn, an upcoming portion of road that is compatible with autonomous driving compatible, a traffic situation, or the like, may be provided for display on a HUD and may correspond with information presented on the user interface 200.

While the aforementioned embodiments have focused on a display providing a circular user interface of a route guidance system, embodiments may include a rectangular interface, such as the one depicted in FIG. 9. As shown, the interface 400 includes a map display area 404 including a current location icon 416 and a route 414 of the route guidance system. Further, a first representation of the route 420 and a second representation of the route 430 are presented along the bottom of the display having an origin 402 and a destination 404. The illustrated representations of the route 420 and 430 include parallel bars adjacent to one another. As with the circular representations of the route, the parallel bar routes may be immediately adjacent to one another, or include a visual buffer there between whose size is dependent upon the thickness of the bars representing the route, the visual markers presented on the representations of the routes, or some combination thereof. Typically, the gap between the representations of the route will be small, such as 5 millimeters or less, depending upon the size of the display. While the illustrated embodiment depicts the representations of the route extending along the bottom of the display, the representations of the routes can be presented along the sides of the interface, or along the top. The representations of the route 420/430, further include identification indicators such as 424, and position icon 410 indicating the progress along the route.

According to an example embodiment of the present invention, the map display region of the user interface may provide for display of additional information to a user to facilitate the route guidance. For instance, a user may be presented with an illustration or an animation of the final portion of the route to clarify to a user where their destination is relative to the route. This illustration or animation of the final portion of the route may be presented to a user as they approach the final portion of the route, such as the final mile of the route, or presented at an instance in which the determined speed of the user/vehicle is below a threshold. As a user travels along the route, when the user comes to a stop at, for example, a traffic light, the map display region may cease to display the present location of the user and present an illustration or animation of the final portion of the route. This may include, for example, street level imagery of the destination and the approach to the destination. The street level imagery may assist a user in identifying the façade of a building, for example, when the building is at the destination address.

The illustration or animation of the final portion of the route may further include an animation instructing a user where to park a vehicle, such as at a specific reserved spot within a parking lot or parking structure. FIG. 10 illustrates such an example embodiment in which a user may be presented with an enhanced street-level imagery interface directing them where to park their vehicle. In the illustrated embodiment, a text window 440 indicates the name and/or address of the parking structure, together with a floor and location. A route 444 is indicated in a virtual representation of the parking structure 442. This final portion of the route may be provided for display to a user when the user is stopped, or when a user requests such a feature.

FIG. 11 is a flowchart illustrative of a method according to example embodiments of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 26 of an apparatus employing an embodiment of the present invention and executed by a processor 24 of the apparatus 20. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

FIG. 11 illustrates a method for providing a user interface for route guidance in a navigation system. As shown at 510, an origin and a destination may be received at 510. The origin may be a current location of the user, or a location entered by the user. The destination may be entered by a user, or a predetermined destination may be predicted or otherwise determined by the navigation system. For example, if a user has an upcoming calendar event with an associated location, the navigation system may extract that information from the calendar event and use that as, or offer that location as the destination. Using the origin and destination, a map data service provider 108 or the navigation system may determine a route between the origin and destination. A representation of the origin, a representation of the destination, and a representation of the route may be presented at 520. A location of the present location may also be presented on the representation of the route at 530. The route may be presented in a substantially circular shape, defining a map display region therein. A map may be provided for display within the map display region substantially surrounded by the representation of the route at 540. Optionally, a second representation of the route may be provided in a concentric circle or portion of a circle about the first representation of the route as shown at 550. The first representation of the route and the second representation of the route may each display information related to the route, with each representation providing a different level and/or type of information regarding the route.

In an example embodiment, an apparatus for performing the method of FIG. 11 above may comprise a processor (e.g., the processor 24) configured to perform some or each of the operations (510-550) described above. The processor may, for example, be configured to perform the operations (510-550) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 510-550 may comprise, for example, the processor 24 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one non-transitory memory including computer program code instructions, the computer program code instructions configured to, when executed, cause the apparatus to at least:
   receive an indication of an origin and a destination;
   provide for presentation of a representation of the origin, a representation of the destination and a representation of a route there between, wherein the representation of the route comprises a bar extending in a circular shape between the representation of the origin and the representation of the destination, wherein progress along the route is depicted on the bar extending in the circular shape indicating a relative location on the bar between the representation of the origin and the representation of the destination, and wherein the circular shape defines a map display region therein;
   provide for presentation of a present location indicator on the representation of the route; and
   provide for presentation of a map within the map display region, wherein the map within the map display region corresponds to at least one of: a current location along the route or a user selected location along the route.

2. The apparatus of claim 1, wherein the computer program code instructions are further configured to, when executed, cause the apparatus to:
   provide for presentation of a map within the map display region, wherein the map within the map display region corresponds to a location along the route corresponding to a user input at a first point corresponding to the location on the representation of the route; and
   dynamically pan the map within the map display region along the route in response to the user input moving along the representation of the route.

3. The apparatus of claim 1, wherein the representation of the origin and the representation of the destination are provided for presentation proximate one another, and wherein the representation of the route extends about at least 330 degrees of a circular shape.

4. The apparatus of claim 1, wherein the computer program code instructions are further configured to, when executed, cause the apparatus to:
   provide for presentation of at least one event indicator on the representation of the route; and
   provide for presentation of information related to one of the at least one event indicators in response to the current location along the route corresponding to the position of the one of the at least one event indicators on the representation of the route.

5. The apparatus of claim 4, wherein causing the apparatus to provide for presentation of information related to one of the at least one event indicators comprises causing the apparatus to provide for presentation of the information within the map display region or on a heads-up display.

6. The apparatus of claim 1, wherein the apparatus is within a vehicle, and wherein the computer program code instructions are further configured to, when executed, cause the apparatus to:
   determining a speed of the vehicle;
   provide for presentation of a map within the map display region, wherein the map within the map display region corresponds to a portion of the route and does not include the current location of the vehicle in response to the speed of the vehicle falling below a predetermined value; and
   provide for presentation of a map within the map display region, wherein the map within the map display region corresponds to a portion of the route including the current location of the vehicle in response to the speed of the vehicle rising above a predetermined value.

7. The apparatus of claim 1, wherein the representation of the route comprising a bar extending in a circular shape is a first representation of the route, wherein the computer program code instructions are further configured to, when executed, cause the apparatus to:
   provide for presentation of a second representation of the route in a concentric circular shape about the first representation, wherein the first representation of the route provides a first type of information about the route, and wherein the second representation of the route provides a second type of information about the route.

8. The apparatus of claim 7, wherein the first type of information comprises information relating to traffic flow, wherein the second type of information comprises information relating to navigation instructions.

9. The apparatus of claim 1, wherein the computer program code instructions are further configured to, when executed, cause the apparatus to:
   provide for presentation of an indication on a portion of the representation of the route that the portion of the route corresponding to the portion of the representation of the route is compatible with autonomous vehicle operation.

10. A computer program product comprising at least one non-transitory computer-readable storage medium having computer-executable program code instructions stored therein, the computer-executable program code instructions comprising program code instructions to:
receive an indication of an origin and a destination;
provide for presentation of a representation of the origin, a representation of the destination and a representation of a route there between, wherein the representation of the route comprises a bar extending in a circular shape between the representation of the origin and the representation of the destination, wherein progress along the route is depicted on the bar extending in the circular shape indicating a relative location on the bar between the representation of the origin and the representation of the destination, and wherein the circular shape defines a map display region therein;
provide for presentation of a present location indicator on the representation of the route; and
provide for presentation of a map within the map display region, wherein the map within the map display region corresponds to at least one of: a current location along the route or a user selected location along the route.

11. The computer program product of claim 10, further comprising program code instructions to:
provide for presentation of a map within the map display region, wherein the map within the map display region corresponds to a location along the route corresponding to a user input at a first point corresponding to the location on the representation of the route; and
dynamically pan the map within the map display region along the route in response to the user input moving along the representation of the route.

12. The computer program product of claim 10, wherein the representation of the origin and the representation of the destination are provided for presentation proximate one another, and wherein the representation of the route extends about at least 330 degrees of a circular shape.

13. The computer program product of claim 10, further comprising program code instructions to:
provide for presentation of at least one event indicator on the representation of the route; and
provide for presentation of information related to one of the at least one event indicators in response to the current location along the route corresponding to the position of the one of the at least one event indicators on the representation of the route.

14. The computer program product of claim 13, wherein the program code instructions to provide for presentation of information related to one of the at least one event indicators comprises program code instructions to provide for presentation of the information within the map display region or on a heads-up display.

15. The computer program product of claim 10, further comprising program code instructions to:
determining a speed of a vehicle;
provide for presentation of a map within the map display region, wherein the map within the map display region corresponds to a portion of the route and does not include the current location of the vehicle in response to the speed of the vehicle falling below a predetermined value; and
provide for presentation of a map within the map display region, wherein the map within the map display region corresponds to a portion of the route including the current location of the vehicle in response to the speed of the vehicle rising above a predetermined value.

16. The computer program product of claim 10, wherein the representation of the route comprising a bar extending in a circular shape is a first representation of the route, the computer program product further comprising program code instructions to:
provide for presentation of a second representation of the route in a concentric circular shape about the first representation, wherein the first representation of the route provides a first type of information about the route, and wherein the second representation of the route provides a second type of information about the route.

17. The computer program product of claim 16, wherein the first type of information comprises information relating to traffic flow, wherein the second type of information comprises information relating to navigation instructions.

18. The computer program product of claim 10, further comprising program code instructions to:
provide for presentation of an indication on a portion of the representation of the route that the portion of the route corresponding to the portion of the representation of the route is compatible with autonomous vehicle operation.

* * * * *